United States Patent [19]

Malmusi

[11] 4,168,132
[45] Sep. 18, 1979

[54] BRACKET ASSEMBLY

[76] Inventor: Mario Malmusi, Via del Lavora 95, Casalecchio di Reno, Bologna, Italy

[21] Appl. No.: 848,440

[22] Filed: Nov. 3, 1977

[30] Foreign Application Priority Data

Nov. 3, 1976 [IT] Italy ................... 3577 A/76

[51] Int. Cl.² .................. B23B 47/00; B23C 1/00
[52] U.S. Cl. ..................... 408/234; 409/64
[58] Field of Search ............ 408/234, 241, 87, 88, 408/89, 90; 90/11 R

[56] References Cited

U.S. PATENT DOCUMENTS

| 1,154,035 | 9/1915 | Locke | 408/234 |
| 1,515,924 | 11/1924 | Blair | 408/234 |

Primary Examiner—Harrison L. Hinson
Attorney, Agent, or Firm—Allison C. Collard; Thomas M. Galgano

[57] ABSTRACT

A bracket assembly for the spot-facing of holes of difficult access in a workpiece includes a lower generally horizontally disposed support base, an upper elongated hollow member coupled to said base and having a relatively narrow projecting front end which is dimensioned to reach into workpiece recesses of difficult access, and a rotatable main drive shaft and a rotatable tool arbour carried by the upper member spaced from one another. The assembly also includes means for coupling the main drive shaft to the tool arbour to permit the main drive shaft to drive the tool arbour.

12 Claims, 6 Drawing Figures

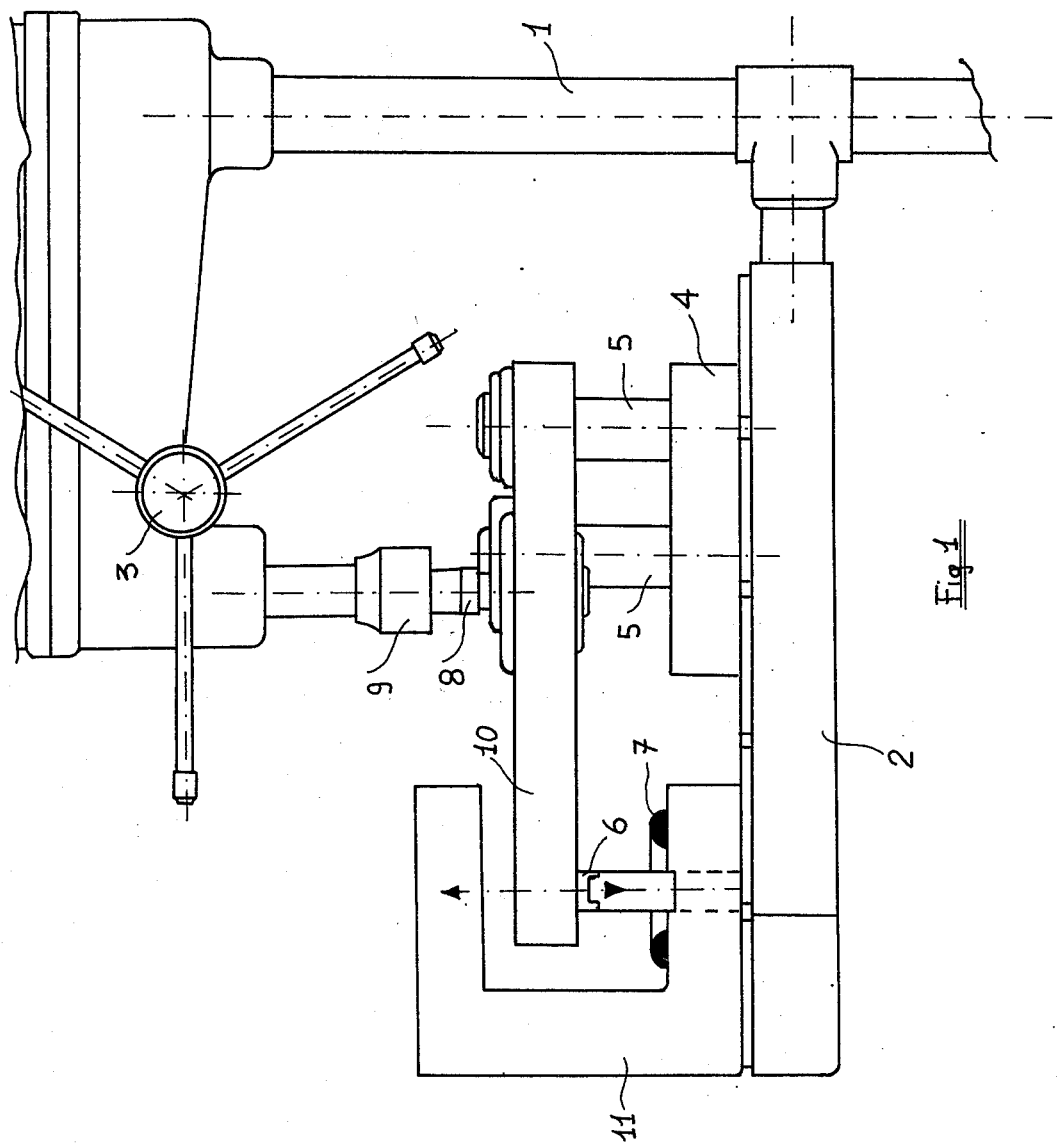

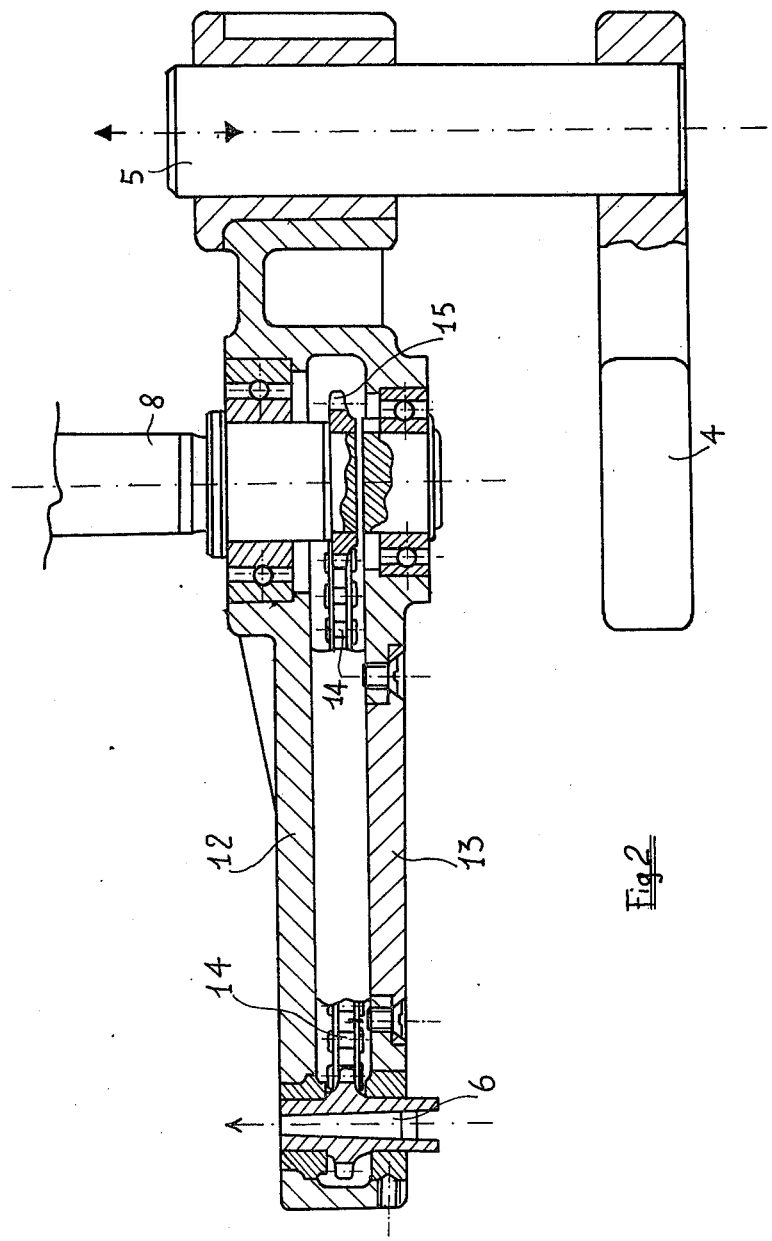

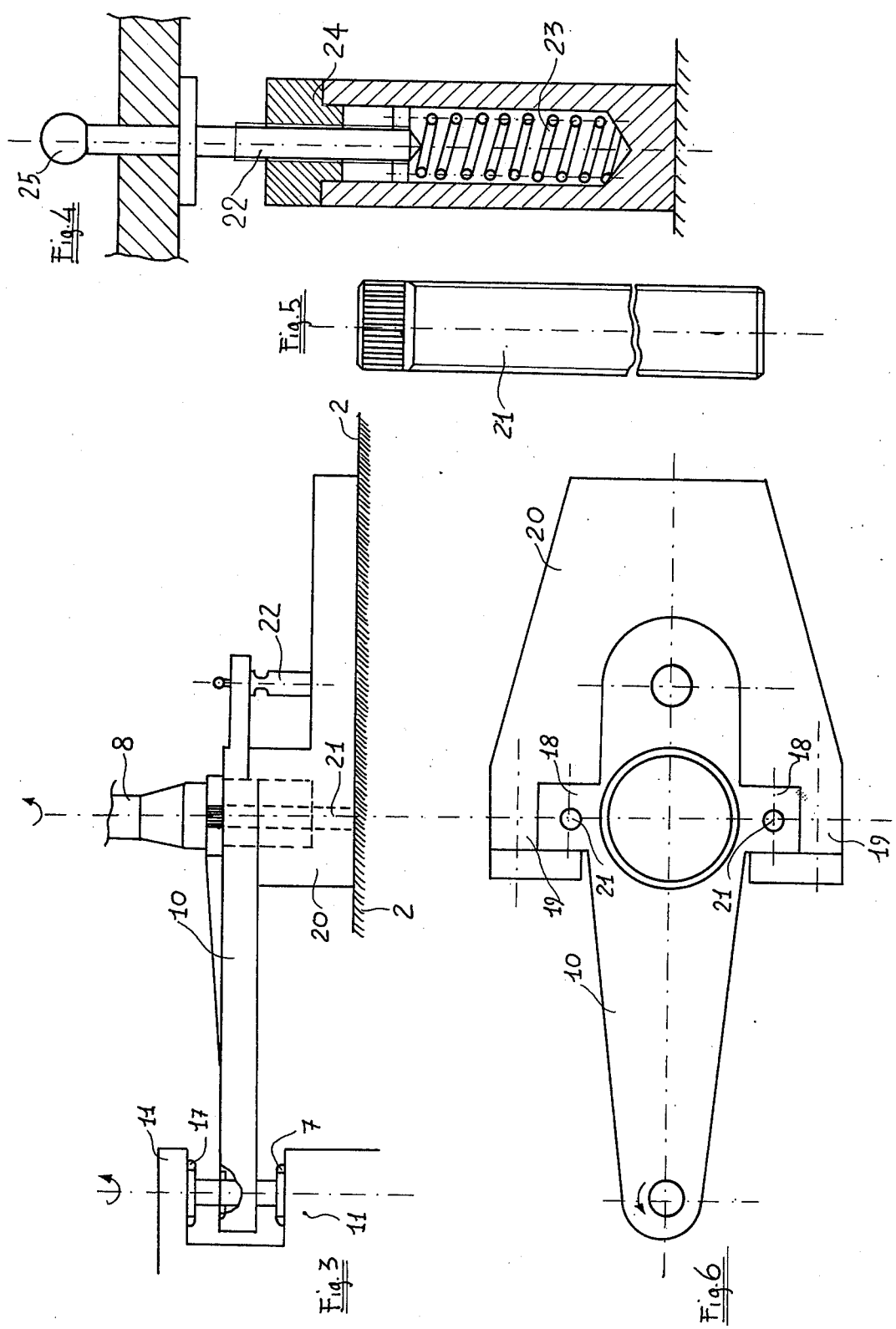

BRACKET ASSEMBLY

The present invention relates to a bracket assembly, particularly intended for use in cooperation with drill presses and drill tools, which facilitates the drilling of holes in workpieces, by spot-facing holes of especially difficult access. More particularly, it relates to a bracket assembly which, through an apporture transmission, permits the operation of a drill tool spaced from a parallel to the drive shaft of the drill.

The present invention especially relates to such a bracket assembly which can be mounted on a drill press or can be operated as a self contained unit with its own motor depending on the characteristics of the workpiece being tooled. More specifically, the bracket assembly is intended to be mounted on a drill press when it is more convenient to move the workpiece onto the drill press' working surface (such as when the workpiece is of relatively small dimensions.) Alternatively, the bracket assembly is intended to be used as a self contained unit, when it is preferable to position the device itself on the workpiece (such as when the workpiece is of relatively large dimensions.)

No assembly of this type is available in the market today. In fact, in order to spot-face holes in practically unaccessible workpiece recesses one must presently make recourse to a series of technical contrivances which entail various operations (also with a stopped machine) with a consequent loss of time.

Accordingly, the object of the present invention is to eliminate such inconveniences, reducing the above-mentioned operations to a single, easily executable one.

These and other related objects are attained in accordance with the present invention by the provision of a bracket assembly which includes a lower base for supporting and clamping, at least one upstanding guide column which is mounted on said base and an upper projecting element which is slidably mounted on the guide column.

The projecting element, in bracket form, is adjustable in height with respect to the base by the greater or lesser penetration of the guide columns. It is shaped in such a way as to present in its extreme forward part, which houses the tool, the smallest possible dimensions, so that it can penetrate into recesses of the smallest dimensions. The overall form of the upper element is similar to an irregular rhombus fixed at three vertices to the columns and with the fourth vertex, much farther from the center of the other three, provided with the tool. It is, in addition, of sufficient thickness to contain inside the driving unit which transmits motion from the driving shaft (placed practically at the center of the rhombus) to the tool spindle, placed at the forward end of the upper element with its axis parallel to that of the shaft.

In a first way of execution, power transmission from the drive shaft to the tool spindle is obtained by means of a chain which joins a cogwheel splined to the driving shaft to a wheel splined to the tool arbor. In a second way of execution, the transmission may be achieved by means of a train of gears; in the third, by means of a small horizontal shaft carrying two bevel gears at the ends which mesh with two bevel gears splined to the main and driven shafts. In a fourth, one may adopt a belt transmission.

In the first way of execution, the vertically-disposed tool arbour is preferably provided with prospective thrust bearings, and carries a splined cogwheel, and presents a recess for accepting the tool's tang. The main shaft, also preferably having thrust bearings and carrying a driving cogwheel, protrudes superiorly in such a way that the end bevel part is co-axial to the spindle of the drill, which, in the first way of effectuation, is the driving element of the apparatus. In the second way of effectuation, the end of the main shaft is desirably directly coupled to an autonomous motor.

In a preferred embodiment of the invention, improvements are made involving modifications of the tool-head, the bearing structure, and the addition of a cushioning device for the bending stresses, and one for positioning the tool (spot-facer) in the lower part of the forward end of the bracket projecting downwardly; i.e. for drilling holes underneath the tool, that a multiple toolholder connection be adopted, so it is possible to machine recesses located even above the bracket by simply mounting two spot-facers, one directed above and one directed below, both driven by the same transmission. Although they have to be used singly, they save the time which would have been necessary to turn the piece over and reposition it, or, in the second way of effectuation, to reposition the turned-over apparatus. The bearing structure desirably includes one rather than three circular columns, on which various square, roller or dovetail guides have been tooled to permit guiding of the upper projecting element thereon. The upper projecting element is preferably provided with a series of guides coupling with those of the column so that it may slide on the bearing element or column in such a way as to obtain the same effect of required parallelism, (i.e. the upper element remaining parallel to the base), as with three guide columns.

At the rear end of the apparatus, beneath the rearward end of the upper projecting element a cushioning device and a bend compensator is advantageously mounted. It is known that the upper bracket element, when tooling with the lower tool, is subject at the toolholder end, to a tooling reaction directed upwards, with a consequent dapping reaction directed downwards; one therefore has, in spite of the guides' precision, a tendency of the rear part of the apparatus to approach its supporting base. This minimal bracket flexure, which can produce tooling defects, may be desirably eliminated by the provision of a cushioning device consisting of a drilled or hollow sleeve inside of which can slide a screw controlled by an external knob opposed in its movement by a return spring which is supported on the lower base beneath the rear end of the upper bracket element. A preliminary adjustment of the spring tension produces an upwards thrust on the bracket's rear part which opposes the stress which arises when tooling with the lower tool, maintaining the bracket perfectly horizontal and in this way ensuring a perfect spot-facing of the hole. In the case where it is desired to also compensate for the flexure produced by tooling with the upper tool, it would be sufficient to duplicate the spring device, producing, with their being placed under tension, a downwards thrust, or else to make use of the resistance to traction of a single spring usable for compensation in both tooling arrangements.

Most desirably, in an approximately central position of the apparatus there are located some threaded cylindrical elements passing through the bracket with a groove on the supporting base in such a way as to regulate the vertical movement (working stroke) of the bracket itself, once positioned on the piece to be machined.

Other objects and features of the present invention will become apparent from the following detailed description considered in connection with the accompanying drawing which discloses the embodiments of the invention. It is to be understood, however, that the drawing is designed for the purpose of illustration only and not as a definition of the limits of the invention.

In the drawing, wherein similar reference characters denote similar elements throughout the several views:

FIG. 1 is a side elevational view of the apparatus embodying the present invention mounted on a drilling machine;

FIG. 2 is a fragmentarily-illustrated cross-section view, in part elevation of the apparatus shown in FIG. 1;

FIG. 3 is a fragmentarily-illustrated side elevation view of another embodiment of the apparatus;

FIG. 4 is a cross-sectional view of the cushioning element used in the apparatus shown in FIG. 3.

FIG. 5 is a side elevational view of the positioning head used in the apparatus shown in FIG. 3; and FIG. 6 is a top plan view of the apparatus shown in FIG. 3.

Referring now in detail to the drawings, a drill press is shown comprising an upstanding drill column 1 which supports a horizontally disposed work surface 2 and an overhead housing on which are mounted the drill controls 3 and a downwardly directed drill spindle 9. The bracket assembly includes a support base 4 mounted on work surface 2, a plurality of upstanding guide columns 5 mounted on base 4, and a hollow horizontally disposed upper bracket 10 slidably mounted on columns 5. Upper bracket 10 rotatably supports at its forward end a vertically disposed driven shaft 6 and, generally about its center portion a vertically disposed, rotatable drive shaft 8 which is coupled to drill spindle 9. As can be seen in FIGS. 1 and 3, the forward end of the bracket 10 is inserted in the U-shaped recess of a workpiece 11.

As shown in FIG. 2, bracket 10 includes a hollow bracket body 12, on the lower surface of which is removable cover 13. A drive chain 14 is received about a drive gear 15 on the drive shaft 8 and a driven gear on driven shaft 6, so that rotation of the drive shaft 8 will, in turn, effect rotation of the driven shaft.

As shown in the embodiment of FIG. 3, the driven shaft may support an upper tool 17 and a lower tool 7. As can be seen in FIG. 6, in the preferred embodiment of the invention, bracket 10 is provided with two lateral, outwardly projecting, rectangular-shaped, apertured guide members 18, which are slidably mounted in complimentary-shaped bearing or guide elements 19 formed in the lower fixed base 20 of the apparatus, which, in turn, is fixed to the drill press platform. Although only partially illustrated, a threaded cylindrical positioning head 21 is provided which passes through a threaded groove in the upper bracket and is disposed for contact with the supporting base. The positioning head by its threaded portion may be used to regulate the vertical movement or working stroke of the upper bracket relative to the base. A cushioning element 22 is also provided which consists of a hollow tube in which is placed a return spring 23 which coacts with a screw 24 and which has an external adjusting knob 25. The cushioning element is mounted on the base and biasely supports the rear end of the upper bracket element 10 to counteract flexure caused by the drilling operation. More specifically, the cushioning element may be adjusted by means of the vertical screw to compress the coaxial spring, thus causing an upward thrust proportional to the degree of spring compression.

The functioning of the apparatus with reference to the first way of effectuation (apparatus mounted on the drilling machine) and the first way of execution (chain transmission) is the following: the apparatus is positioned on the drill's working surface 2, fixed with through pins or brackets, according to the type of work surface, and then connected to the machine tool spindle 9, coaxial to the main shaft 8 of the apparatus. This it is positioned in height (varying the distance between the bracket 10 and the apparatus's lower base 4) by means of the arm regulation controls, in such a way as to permit the desired stroke of the drill spindle (acutated by the manual control). The spindle 9, by means of the opportune transmission, will impart the same travel and the same rotation to the tool 7 placed at the front end of the apparatus. In this way the tool can easily enter and therefore tool holes in the recesses (existing in the piece being tooled placed on the work surface) inaccessible to a cutter mounted directly in the drill spindle.

While only a few embodiments of the present invention have been shown and described, it will be obvious that many changes and modifications may be made thereunto without departing from the spirit and scope of the invention.

What is claimed is:

1. A bracket assembly for spot-facing of holes of difficult access comprising:
 a lower generally horizontally disposed, support base;
 an upper elongated hollow member coupled to said base and having a relatively narrow projecting front end which is dimensioned to reach into workpiece recesses of difficult access;
 at least one upstanding guide column mounted on said lower base, which column slidably supports said upper member to permit movement of said upper member either toward or away from said support base;
 a rotatable main drive shaft and a rotatable tool arbour carried by said upper member spaced from one another; said shaft and said arbour being disposed parallel to one another and in a generally vertical disposition relative to said horizontally-disposed support base; and
 means for coupling said main drive shaft to said tool arbour to permit said main drive shaft to drive said tool arbour.

2. The assembly according to claim 1 additionally including means for driving said main shaft.

3. The assembly according to claim 2, wherein said means comprises a vertically movable, rotatable spindle of a drill press which is coaxially disposed and coupled to said drive shaft.

4. The assembly according to claim 3 wherein said tool arbour is vertically movable and the movement thereof is controlled by a manual drill control of the drill press.

5. The assembly according to claim 4 wherein the direction of rotation and vertical traverse of the drill spindle and the tool arbour are the same.

6. The assembly according to claim 1 wherein said coupling means are mounted within said upper member.

7. The assembly according to claim 5 wherein vertical movement of said tool arbour is effected by vertical sliding movement of said upper member.

8. The assembly according to claim 1, wherein said tool arbour has an upper and lower end and includes means for mounting two tools thereon, one on its upper end and one on its lower end.

9. The assembly according to claim 1, wherein said upper member has a vertically extending guide member, and said base has a guide element which mates with said guide member to permit vertical guiding of said upper member on said base.

10. The assembly according to claim 1 wherein said upper element has a rear end and wherein said assembly additionally includes means for biasely supporting the rear end of the upper element to compensate for bending forces imparted to the front end of said upper element caused by tooling stresses.

11. The assembly according to claim 10 wherein said means for supporting comprises a hollow sleeve disposed between the rear end of said upper member and said lower support base in which is mounted a return spring, said device including a threaded pin biasely engaged with said spring and an external control means which move said pin and, in turn, said spring to control the compression thereof.

12. The assembly according to claim 1 additionally including at least one upstanding adjustable positioning head mounted on said lower base which limits the downward vertical movement of said upper member.

* * * * *